United States Patent
Ota (10) Patent No.: US 8,141,959 B2
(45) Date of Patent: Mar. 27, 2012

(54) VEHICLE BRAKE HYDRAULIC PRESSURE CONTROL UNIT

(75) Inventor: Kazuhiro Ota, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 1057 days.

(21) Appl. No.: 11/870,930

(22) Filed: Oct. 11, 2007

(65) Prior Publication Data

US 2008/0088176 A1     Apr. 17, 2008

(30) Foreign Application Priority Data

Oct. 13, 2006  (JP) .............................. P. 2006-280420

(51) Int. Cl.
*B60T 8/60* (2006.01)

(52) U.S. Cl. ........ 303/3; 303/10; 303/113.1; 303/113.4; 303/114.1; 303/115.4; 303/119.1; 303/119.2; 303/119.3; 303/125; 251/52; 251/129.14; 251/129.15; 251/129.19

(58) Field of Classification Search .............. 303/5, 155, 303/119.1, 119.2, 119.3, 114.1, 115.2, 117.1, 303/152; 251/129.15
See application file for complete search history.

(56) References Cited

U.S. PATENT DOCUMENTS

| | | | |
|---|---|---|---|
| 5,184,804 A | | 2/1993 | Shea |
| 5,715,795 A | * | 2/1998 | Guentert et al. ............. 123/467 |
| 5,921,640 A | * | 7/1999 | Mortimer et al. ............ 303/125 |
| 5,984,263 A | * | 11/1999 | Hosoya .................... 251/129.15 |
| 6,318,703 B1 | * | 11/2001 | Goossens et al. ........ 251/129.15 |
| 6,846,408 B2 | * | 1/2005 | Knight .......................... 210/171 |
| 2002/0171286 A1 | | 11/2002 | Ohishi et al. |
| 2007/0045581 A1 | * | 3/2007 | Yoshikawa et al. ...... 251/129.15 |

FOREIGN PATENT DOCUMENTS

| | | |
|---|---|---|
| JP | 6-64154 | 3/1994 |
| JP | 11-37316 | 2/1999 |
| JP | 11 351151 | 12/1999 |
| JP | 2001-280533 | 10/2001 |
| JP | 2002-295375 | 10/2002 |
| JP | 2004-284590 | 10/2004 |

OTHER PUBLICATIONS

Chinese Office Action for corresponding Chinese Application No. 2007-101524678.
English Translation of Chinese Office Action for corresponding Chinese Application No. 2007-101524678.
European Search Report dated Sep. 3, 2009 for related European Application No. EP 09 02 0065.
Japanese Office Action for corresponding Japanese Application No. 2006-280420 (English translation).

* cited by examiner

*Primary Examiner* — Robert Siconolfi
*Assistant Examiner* — San Aung
(74) *Attorney, Agent, or Firm* — Andrew M. Calderon; Roberts Mlotkowski Safran & Cole, P.C.

(57) ABSTRACT

A vehicle brake hydraulic pressure control unit including a base body including a brake fluid flow path and a mounting hole portion having a bottom sealing surface and an inner circumferential sealing surface and an assembled part which is assembled into the mounting hole portion so as to communicate with the flow path. The assembled part includes a lower end sealing portion hermetically contacting with the bottom sealing surface of the mounting hole portion to form a lower side sealing portion and an outer circumferential sealing portion hermetically contacting with the inner circumferential sealing surface of the mounting hole portion to form a circumferential sealing portion. A hermetic accommodation space is defined by the lower side sealing portion and the circumferential sealing portion.

14 Claims, 10 Drawing Sheets

VEHICLE BRAKE HYDRAULIC PRESSURE CONTROL UNIT

BACKGROUND OF THE INVENTION

1. Field of the Invention

The present invention relates to a vehicle brake hydraulic pressure control unit which is characterized in a mounting construction of assembled parts such as an electromagnetic valve, a pump and a pressure sensor.

2. Description of Related Art

As vehicle brake hydraulic pressure control units for controlling the magnitude of a brake hydraulic pressure which is applied to wheel brakes, there are known vehicle brake hydraulic pressure control units which include a base body which incorporates therein a brake fluid flow path and assembled parts such as an electromagnetic valve, a pump and a pressure sensor (for example, refer to Japanese Patent Unexamined Publication No. JP-A-2001-280533).

Incidentally, in JP-A-2001-280533, an electromagnetic valve, which is one of assembled parts, is assembled in place in a bottomed mounting hole portion which is provided in a base body in such a manner as to communicate with a flow path in an interior of the base body by depressing a relevant location of the surface of the base body thereinto. In addition, in JP-A-2001-280533, a plastically deformed portion is formed on a hole wall of the mounting hole portion by inserting a lower end portion of the electromagnetic valve into a lower portion of the mounting hole portion for clamping and thereafter pressing the surface of the base body around the periphery of an opening in the mounting hole portion, and the plastically deformed portion so formed is caused to enter a locking groove formed on an outer circumferential surface of the electromagnetic valve, so as to prevent the dislocation of the electromagnetic valve from the mounting hole portion.

Incidentally, when the lower end portion of the electromagnetic valve is press fitted in the lower portion of the mounting hole portion, the lower end portion of the electromagnetic valve needs to be caused to slide along the hole wall of the mounting hole portion. Therefore, there may occur a case where fine chippings (metallic ones) are produced in the lower portion of the mounting hole portion, depending upon a combination of tolerances in the dimensions of the relevant parts.

In the event that the chippings so produced are mixed into brake fluid, there is caused a fear that the sliding resistance is increased in the slide portion of the vehicle brake hydraulic pressure control unit, and to be worse, there is caused a fear that the seal portion is worn.

In addition, the aforesaid problem applies to the electromagnetic valve which constitutes the assembled part, in addition, the aforesaid problem applies to the pump, the reservoir and the pressure sensor when they constitute the assembled part.

SUMMARY OF THE INVENTION

The invention has been made from the viewpoint of solving the problem, and an object thereof is to provide a vehicle brake hydraulic pressure control unit which can prevent the flow out into the brake fluid flow path of chippings produced when the assembled part is press fitted in the mounting hole portion in the base body.

With a view to solving the problem, according to an aspect of the invention, there is provided a vehicle brake hydraulic pressure control unit including:

a base body including:

a brake fluid flow path; and
a mounting hole portion including;
   a bottom sealing surface formed on a bottom surface thereof; and
   an inner circumferential sealing surface formed on an inner circumferential surface thereof; and
an assembled part which is assembled into the mounting hole portion so as to communicate with the flow path, the assembled part including:
   a lower end sealing portion formed on a lower end surface thereof and hermetically contacting with the bottom sealing surface of the mounting hole to form a lower side sealing portion; and
   an outer circumferential sealing portion formed on an outer circumferential surface thereof and hermetically contacting with the inner circumferential sealing surface of the mounting hole portion to form a circumferential sealing portion, wherein
a hermetic accommodation space is defined by the lower side sealing portion and the circumferential sealing portion.

In the present invention, the assembled part means a general designation for parts which are assembled to the base body to embody a hydraulic circuit and it contains at least an electromagnetic valve, a pump, a reservoir, a pressure sensor and the like are included. In addition, when used together with the assembled part in the specification of this application, "upper" and "lower" are based on the state in which the assembled part is assembled in place in the mounting hole portion, and the "lower end portion" of the assembled part means the end portion thereof which lies on the bottom surface side of the mounting hole portion.

According to the vehicle brake hydraulic pressure control unit of the invention, even in the event that chippings are produced when the assembled part is press fitted in the mounting hole portion in the base body, the chippings so produced can be sealed in the accommodation space. Namely, according the vehicle brake hydraulic pressure control unit of the invention, the mixing of chippings into brake fluid can be prevented. Therefore, the increase in siding resistance in the slide portion of the vehicle brake hydraulic pressure control unit can be suppressed, and furthermore, the wear of the seal portion can be prevented. In addition, by bringing the lower end surface of the assembled part into abutment with the bottom surface of the mounting hole portion, the inserting position of the assembled part is restricted. Furthermore, the hole wall of the mounting hole portion is clamped while maintaining the state in which the lower end surface of the assembled part is in abutment with the bottom surface of the mounting hole portion. Therefore, the assembled part is made difficult to be inclined when the assembled part is fixed. In addition, the lower end surface of the assembled part may be caused to sink into the bottom surface of the mounting hole portion.

According to a second aspect of the invention, as set forth in the first aspect of the invention, it is preferable that
a lower end portion of the assembled part includes:
   a press-fit portion which is press fitted in the inner circumferential sealing surface of the mounting hole portion; and
   a small diameter portion whose diameter is smaller than a diameter of the press-fit portion, and
the accommodation space is further defined by an outer circumferential surface of the small diameter portion and an inner circumferential surface of the mounting hole.

Furthermore, according to a third aspect of the invention, as set forth in the second aspect of the invention, it is more preferable that the small diameter portion is formed on a lower side of the press-fit portion, and a lower end surface of the small diameter portion is brought into abutment with the bottom sealing surface of the mounting hole portion.

By adopting these configurations, when press fitting the lower end portion of the assembled part in the abutment portion of the mounting hole portion, the small diameter portion functions as a "guide" and therefore, the press fitting work is facilitated.

According to a fourth aspect of the invention, as set forth in the first aspect of the invention, it is preferable that a circumferential groove is provided on the inner circumferential surface of the mounting hole portion along a circumferential direction, and the accommodation space is further defined by the circumferential groove.

According to a fifth aspect of the invention, as set forth in the first aspect of the invention, it is preferable that a bottom groove is provided on the bottom surface of the mounting hole portion along an outer circumference of the bottom surface, and wherein the accommodation space is further defined by the bottom groove.

Since working on the assembled part can be omitted or simplified in the event that the accommodation space is formed by working on the mounting hole portion, a conventional assembled part can be carried over for use in the vehicle brake hydraulic pressure control unit of the invention. In addition, in the event that working on the assembled part is simplified, it becomes possible to secure the accommodation space without reducing the strength of the housing of the assembled part. In addition, since the bottom groove can be formed by a candle-type drill, the bottom groove can be formed more simply and inexpensively than the circumferential groove.

Preferably, according to a sixth aspect of the invention, as set forth in the first aspect of the invention, the lower end surface of the assembled part is formed into a shape which protrudes towards the bottom surface of the mounting hole portion.

By adopting this configuration, since the contact surface pressure between the lower end surface of the assembled part and the bottom surface of the mounting hole portion is increased, the closeness of the accommodation space is increased further.

According to a seventh aspect of the invention, as set forth in the first aspect of the invention, it is preferable that the mounting hole portion includes:

an introducing portion which is formed at an upper side of the inner circumferential sealing surface; and a tapered portion which connects the inner circumferential sealing surface with the introducing portion, and a diameter of the introducing portion is made larger than a diameter of the inner circumferential sealing surface.

By adopting this configuration, when press fitting the lower end portion of the assembled part in the abutment portion of the mounting hole portion, the tapered portion functions as a "guide" and therefore, the press fitting work is facilitated.

According to an eighth aspect of the invention, as set forth in the first aspect of the invention, it is preferable that a locking groove for a plastically deformed portion formed when a hole wall of the mounting hole portion is clamped to enter is formed on the outer circumferential surface of the assembled part, and an outside diameter of the assembled part at an upper side of the locking groove is made smaller than an outside diameter of assembled part at a lower side of the locking groove.

When the outside diameter of the assembled part at the upper side of the locking groove is made smaller than the outside diameter of the assembled part at the lower part of the locking groove, the diameter of the mounting hole portion after plastic deformation (after clamping) also becomes smaller at the upper side than at the lower side of the locking groove. Consequently, when a force is applied to the assembled part in a direction in which the assembled part is pushed out from the mounting hole portion, a shear fracture plane is formed in such a manner as to rise obliquely upwards from an outer circumferential edge of the lower side of the locking groove. Namely, when the outside diameter of the locking groove is the same at the upper side as at the lower side of the locking groove, the shear fracture distance becomes equal to the groove width of the locking groove. However, according to the vehicle brake hydraulic pressure control unit, since the shear fracture distance becomes equal to or larger than the groove width of the locking groove, even when the groove width of the locking groove is decreased, an assembling strength can be secured which is equal to the assembling strength that is provided when the outside diameter of the assembled part is made the same at the upper side as at the lower side of the locking groove.

According to the vehicle brake hydraulic pressure control unit of the invention, it is possible to prevent the flow out into the brake fluid flow path of chippings produced when the assembled part is press fitted in the mounting hole portion in the base body.

DETAILED DESCRIPTION OF THE PREFERRED EMBODIMENTS

Hereinafter, examples of embodiments of the invention will be described in detail by reference to the accompanying drawings. Note that like reference numerals will be given to like elements, so as to omit the repetition of similar descriptions.

(First Embodiment)

Figure 1:
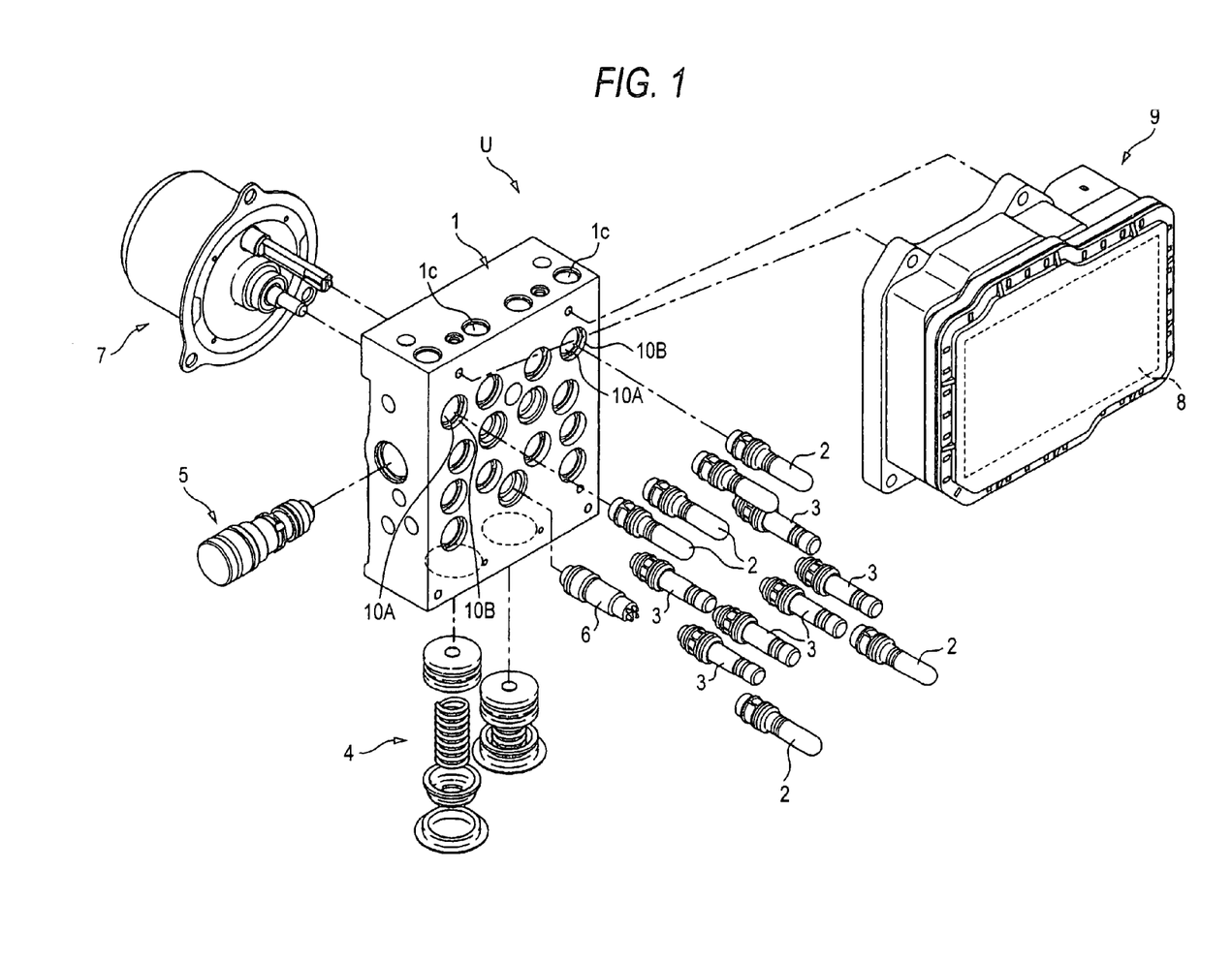
FIG. 1 is an exploded perspective view showing a vehicle brake hydraulic pressure control unit according to a first embodiment of the invention.

As shown in FIG. 1, a vehicle brake hydraulic pressure control unit U according to a first embodiment of the invention is configured to include a base body 1 which incorporates therein a brake fluid flow path, a normally open electromagnetic valve 2 which is an assembled part to be assembled in place in a mounting hole portion 10A formed in the base body 1 and the like. Note that while the vehicle brake hydraulic pressure control unit U includes a motor 7, an electronic control unit 8, a housing 9 and the like in addition to other assembled parts such as a normally closed electromagnetic valve 3, a reservoir 4, a pump 5 and a pressure sensor 6, since they are similar to those mounted in a conventional one, the detailed description thereof will be omitted here.

Figure 2:
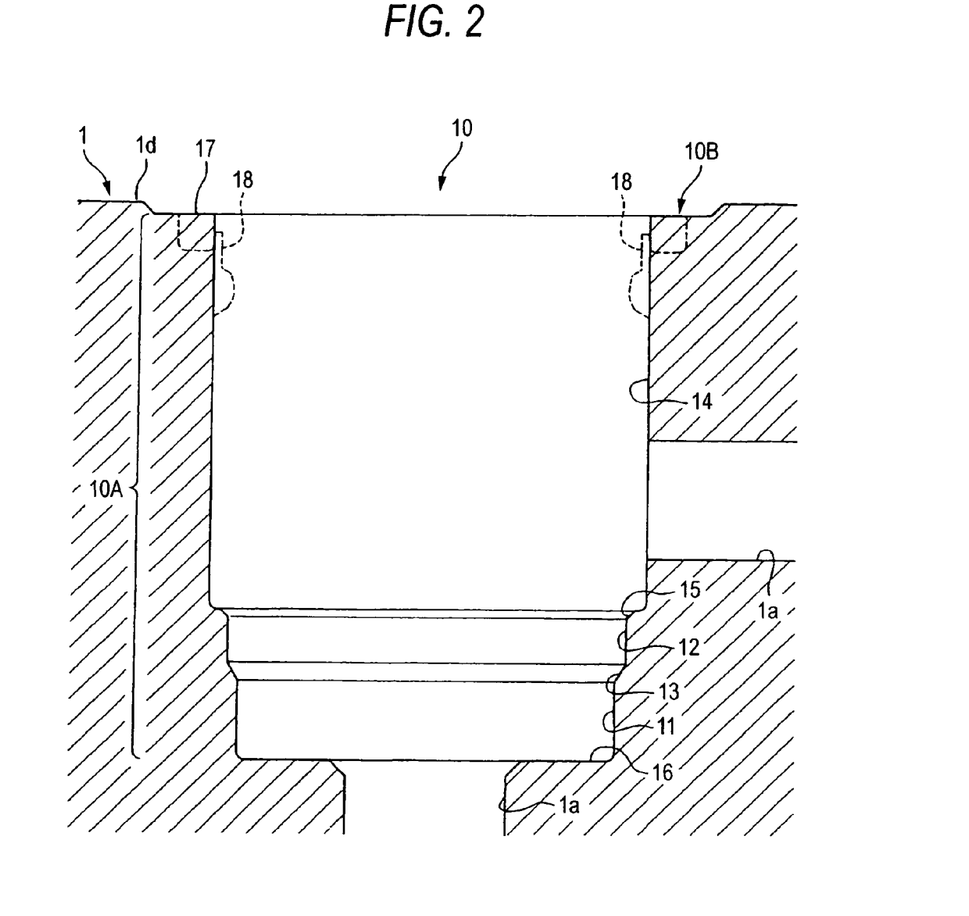
FIG. 2 is a sectional view showing a mounting hole.

The base body 1 is a member which is substantially a rectangular parallelepiped and which is made of aluminum alloy and incorporates therein a brake fluid flow path 1a (refer to FIG. 2). The mounting hole portion 10 in which the normally open electromagnetic valve 2 is mounted and a recessed portion 10B which is formed in such a manner as to surround the mounting hole portion 10A are formed in the base body 1. Furthermore, formed in the base body 1 are holes in which the normally closed electromagnetic valve 3, the reservoir 4, the pump 5, the pressure switch 6 and the like are mounted, an inlet port 1b to which a piping, not shown, which communicates with a master cylinder (not shown) is connected, outlet ports 1c to which pipings, not shown, which reach wheel brakes are connected, and the like. The respective holes are made to communicate with each other directly or via flow paths, not shown, which are formed in the interior of the base body 1.

The mounting hole portion 10A is, as shown in FIG. 2, a bottomed hole which is formed in such a manner as to communicate with flow paths 1a, 1a formed in the interior of the base body 1. In addition, the mounting hole portion 10A includes a cylindrical abutment portion 11 (an inner circumferential sealing surface) which is formed in a lower portion (a deepest portion), a cylindrical introducing portion 12 which is formed in a location which lies shallower than the abutment portion 11, a truncated cone-shaped tapered portion 13 which connects the abutment portion 11 with the introducing portion 12, a cylindrical holding portion 14 which is formed in a location which lies shallower than the introducing portion 12 and a truncated cone-shaped connecting portion 15 which connects the introducing portion 12 with the holding portion 14.

A diameter of the mounting hole portion 10A at the introducing portion 12 is made larger than a diameter at the abutment portion 11, and a diameter of the mounting hole portion 10A at the holding portion 14 is made larger than the diameter at the introducing portion 12. Namely, the mounting hole portion 10A is formed into a stepped cylindrical shape which sequentially increases in diameter as it extends from a bottom surface 16 (a bottom sealing surface) towards an opening thereof.

One of the flow paths 1a, 1a is made to open to the bottom surface 16, while the other is made to open to the holding portion 14. Note that since the flow path 1a is made to open to the bottom surface 16, the bottom surface 16 exhibits a circular belt-like shape.

The recessed portion 10B exhibits the circular belt-like shape when viewed from the top and is formed concentrically with the mounting hole portion 10A. A bottom surface 17 of the recessed portion 10B is formed so that the bottom surface of the mounting hole portion 10A is as a standard. Namely, the recessed portion 10B is not formed by specifying a depth from a surface 1d of the base body 1 but is formed by specifying a depth from the bottom surface 17 of the recessed portion 10B to the bottom surface 16 of the mounting hole portion 10A. In addition, the bottom surface 16 of the mounting hole portion 10A and the bottom surface 17 of the recessed portion 10B are made parallel to each other.

Figure 3:
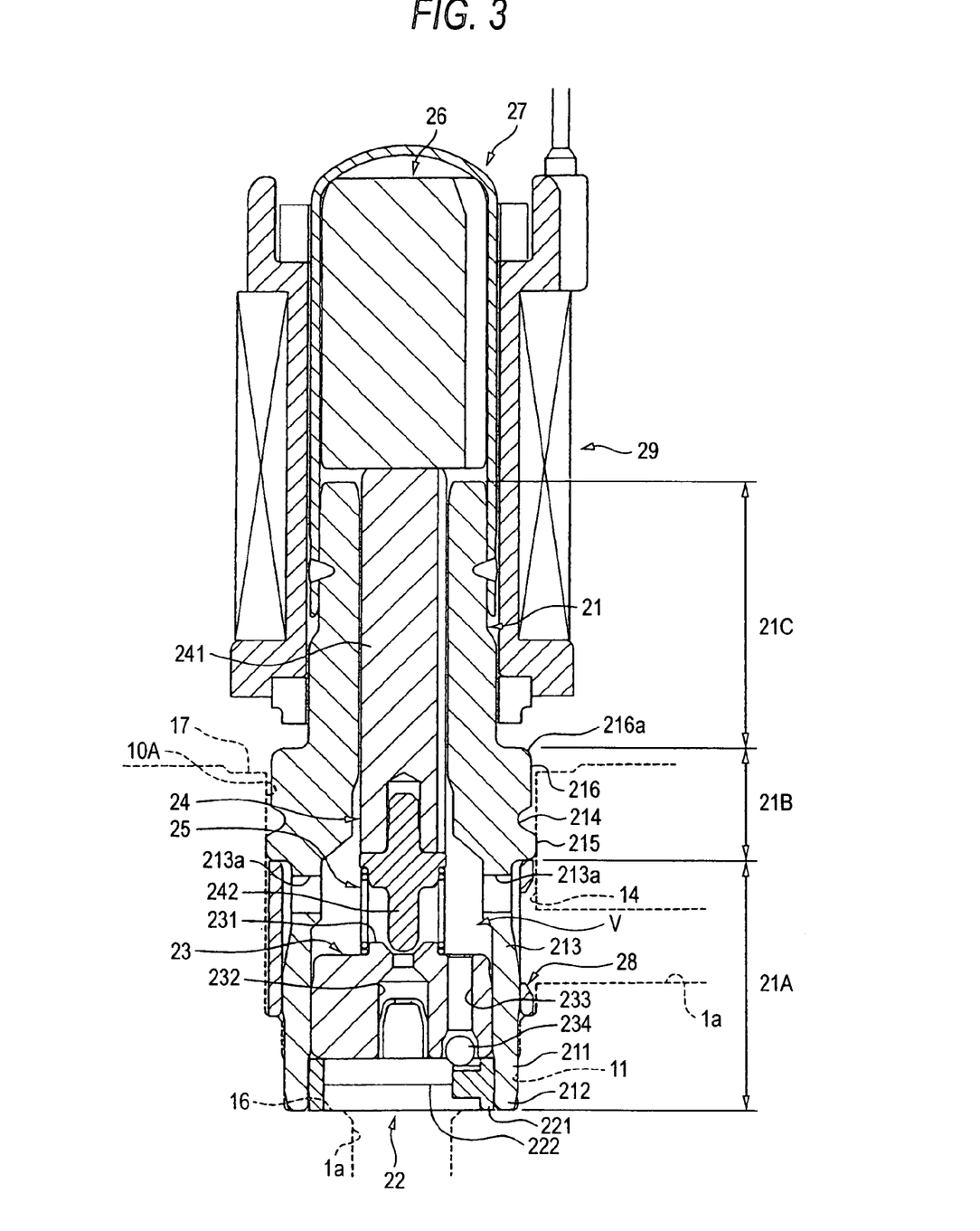
FIG. 3 is a sectional view which explains the configuration of an electromagnetic valve which is an assembled part.

As shown in FIG. 3, the normally open electromagnetic valve 2 is configured to include a cylindrical valve housing 21 which makes up a stationary core, a first dust collecting filter 22 mounted in an inner space of the valve housing 21 in a lower end portion thereof, a valve seat constituting material 23 mounted on an upper side of the dust collecting filter 22 in the inner space of the valve housing 21, a valve element 24 disposed above the valve seat constituting material 23 in the inner space of the valve housing 21, a return spring 25 interposed between the valve seat constituting material 23 and the valve element 24, a movable core 26 disposed on an upper side of the valve element 24, a cover 27 which covers the movable core 26 and a second dust collecting filter 28 mounted in such a manner as to surround an outer circumferential surface of the valve housing 21. In addition, although the electromagnetic valve 2 protrudes from the mounting hole portion 10A, an electromagnetic coil 29 for driving the electromagnetic valve 2 is disposed around the periphery of a protruding part of the electromagnetic valve 2.

The valve housing 21 is made of a magnetic material such as iron or iron alloy and includes an insertion portion 21A which is inserted into the mounting hole portion 10A, a lid portion 21B which closes the opening in the mounting hole portion 10A and a protruding portion 21C which is provided on the lid portion 21B in such a manner as to protrude therefrom. In addition, the inner space of the valve housing 21 is formed into a stepped cylindrical shape which sequentially increases its diameter as it extends in a downward direction.

Figure 4:
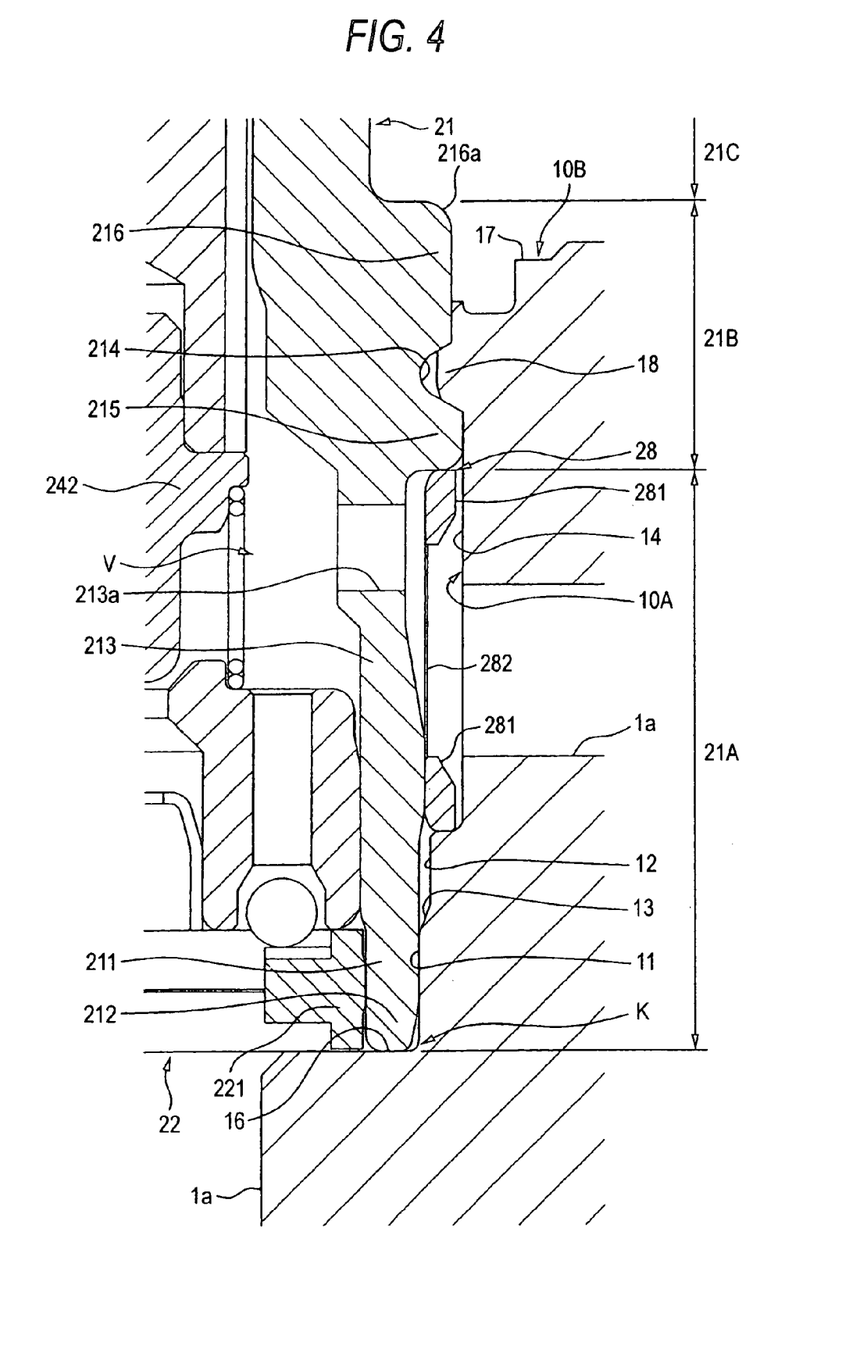
FIG. 4 is an enlarged sectional view which explains the configuration of the electromagnetic valve which is the assembled part.

As shown in FIG. 4, a lower end portion of the insertion portion 21A (that is, a lower end portion of the electromagnetic valve 2) includes a press-fit portion 211 which is press fitted in the abutment portion 11 of the mounting hole portion 10A and a small diameter portion 212 whose diameter is made smaller than the diameter of the press-fit portion 211.

The outside diameter of the press-fit portion 211 is made equal to or slightly larger than the diameter of the mounting hole portion 10A at the abutment portion 11 or the hole diameter of the abutment portion 11, and when the press-fit portion 211 is press fitted in the abutment portion of the mounting hole portion 10A, an outer circumferential surface of the press-fit portion 211 (an outer circumferential sealing portion) is joined to an inner circumferential surface of the abutment portion 11, whereby the leakage of brake fluid by way of the inner circumferential surface of the abutment portion 11 is prevented.

The small diameter portion 212 is formed on a lower side of the press-fit portion 211. A lower end surface of the small diameter portion 212 (a lower end sealing portion) is brought into abutment with the bottom surface 16 of the mounting hole portion 10A over the entirety (along the full circumference) thereof. In addition, a location of the insertion portion 21A which lies further upwards than the press-fit portion 211

(hereinafter, referred to as a "valve compartment constituting portion 213") face inner circumferential surfaces of the introducing portion 12 and the holding portion 14 of the mounting hole portion 10A with a gap defined therebetween. A valve compartment V and a through hole 213a for establishing a communication with the flow path 1a are formed in the valve compartment constituting portion 213.

In the present invention, the lower end sealing portion of the assembled part (the lower end portion of the small diameter portion 212) hermetically contacts with the bottom sealing surface of the mounting hole portion (a bottom surface 16) to form a lower side sealing portion, and the outer circumferential sealing portion of the assembled part (the outer circumferential surface of the press-fit portion 211) hermetically contacts with the inner circumferential sealing surface of the mounting hole portion (abutment portion 11) to form a circumferential sealing portion.

An annular accommodation space K (hermetic accommodation space) is defined by the lower side sealing portion and the circumferential sealing portion. The accommodation space K is a space which can accommodate chippings produced when the press-fit portion 211 (that is, the lower end portion of the electromagnetic valve 2) is press fitted in the mounting hole portion 10A, and the accommodation space K constitutes a tightly closed space due to the outer circumferential surface of the press-fit portion 211 being joined to the inner circumferential surface of the abutment portion 11 of the mounting hole portion 10A and the lower end surface of the small diameter portion 212 (that is, the lower end surface of the solenoid vale 2) being brought into abutment with the bottom surface 16 of the mounting hole portion 10A.

As shown in FIG. 3, a locking groove 214 is provided on an outer circumferential surface of the lid portion 21B by setting back a relevant location into the outer circumferential surface along a circumferential direction thereof so that a plastically deformed portion 18 (refer to FIG. 2) that is formed when a hole wall of the mounting hole portion 10A is clamped enters it. In this lid portion 21B, an outside diameter at an upper side of the locking groove 214 is made smaller than an outside diameter at a lower side thereof. In this embodiment, a difference in outside diameter of 0.4 mm is provided between the upper side and the lower side of the locking groove 214. Note that in the following description, an annular part of the lid portion 21B which lies further downwards than the locking groove 214 is referred to as a "lower lid 215" and an annular part thereof which lies further upwards than the locking groove 214 is referred to as an "upper lid 216."

The lower lid 215 lies further upwards than the flow path 1a which is made to open to the holding portion 14 when the electromagnetic valve 2 is assembled in place in the mounting hole portion 10A. The outside diameter of the lower lid 215 is made larger than the outside diameters of the insertion portion 21A and the protruding portion 21C but is made slightly smaller than the diameter of the mounting hole portion LOA at the holding portion 14 or the hole diameter of the holding portion 14. An outer circumferential surface of the lower lid 215 faces an inner circumferential surface of the holding portion 14 of the mounting hole portion 10A with a slight gap defined therebetween. Note that a lower surface of the lower lid 215 abuts in no case with the hole wall of the mounting hole portion 10A.

The upper lid 216 protrudes from the bottom surface 17 of the recessed portion 10B when the electromagnetic valve 2 is assembled in place in the mounting hole portion 10A. In addition, an upper circumferential edge portion 216a of the upper lid 216 is chamfered. The outside diameter of the upper lid 216 is made smaller than the hole diameter of the holding portion 14 of the mounting hole portion 10A. Namely, an outer circumferential surface of the upper lid 216 faces the inner circumferential surface of the holding portion 14 of the mounting hole portion 10A with a gap defined therebetween.

The protruding portion 21C is a stepped cylindrical shape and an outside diameter of an upper half portion is made smaller than an outside diameter of a lower half portion thereof. Note that the protruding portion 21C is disposed inside the electromagnetic coil 29.

The first dust collecting filter 22 includes a cylindrical frame element 221 which is fitted in the valve compartment constituting portion 213 of the valve housing 21 and a net-like element 222 which is held on the frame element 221.

The valve seat constituting material 23 is a cylindrical member which is fitted in the valve compartment constituting portion 213 of the valve housing 21 and an outer circumferential surface thereof is joined to an inner circumferential surface of the valve compartment constituting portion 213. A valve seat 231 on which the valve element 24 is seated is provided in the center of an upper surface of the valve seat constituting material 23 in such a manner as to protrude therefrom while surrounding a hollow portion 232. In addition, a through hole 233 is formed parallel to the hollow portion 232 in a side portion of the valve seat constituting portion 23, and a spherical element 234 which constitutes a one-way valve is disposed at a lower end portion of the through hole 233. The spherical element 234 closes the through hole 233 when a hydraulic pressure on the dust collecting filter 22 side is higher than a hydraulic pressure on the valve compartment V side. To the contrary, when the hydraulic pressure on the valve compartment V side is higher than the hydraulic pressure on the dust collecting filter 22 side, the spherical element 234 opens the through hole 233.

The valve element 24 is configured to include a slide member 241 which slides in an interior of the protruding portion 21C of the valve housing 21 and a needle member 242 which is mounted at a lower end of the slide member 241. An upper end portion of the slide member 241 protrudes from an upper end face of the valve housing 21 in such a state that the electromagnetic coil 29 is de-energized.

The return spring 25 is made up of a coil spring and is interposed between the valve seat constituting material 23 and the valve element 24 in a compressed state, so as to bias the valve element 24 towards the movable core 26.

The movable core 26 is made of a magnetic material and moves in an interior of the cover 27 in a vertical direction in such a state that a lower end surface thereof is in abutment with an upper end face of the valve element 24. Namely, when the electromagnetic coil 29 is energized, the movable core 26 is attracted by the valve housing 21 which is the stationary core to thereby be caused to move downwards, so as to push the valve element 24 downwards.

The cover 27 exhibits a bottomed cylindrical shape and is placed over an upper portion of the valve housing 21 (or more specifically, an upper half portion of the protruding portion 21C). In addition, the cover 27 is welded along the full circumference thereof to thereby be fixedly secured to the valve housing 21.

The second dust collecting filter 28 is such as to be disposed in such a manner as to surround a through hole 213a in the valve housing 21 and is mounted in such a manner as to extend annularly along the valve compartment constituting portion 213 of the insertion portion 21A of the valve housing 21. As shown in FIG. 4, the second dust collecting filter 28 is configured to include a pair of upper and lower annular rings 281, 281 and a net-like element 282 which is held by these annular rings 281, 281.

In addition, the electromagnetic coil 29 shown in FIG. 3 is assembled in place in the cover 9 (refer to FIG. 1) and is then mounted annularly on the valve housing 21 and the protruding portion 21C when the housing 9 is mounted on the base body 1.

The electromagnetic valve 2, which is configured as has been described heretofore, is closed when the electromagnetic coil 29 is energized and is opened when the electromagnetic coil 29 is de-energized. Namely, when the electromagnetic coil 29 is energized based on a command from the electronic control unit 8 (refer to FIG. 1), the movable core 26 is attracted by the valve housing 21, which is the stationary core, and is then caused to move downwards. Along with this, the valve element 24 moves downwards to be seated on the valve seat 231 of the valve seat constituting material 23 at the lower end portion (the needle member 242) thereof, so as to close the hollow portion 232. In addition, when the electromagnetic coil 29 is de-energized, the valve element 24 and the movable core 26 are pushed back in an upward direction by virtue of the biasing force of the return spring 25, whereby the lower end portion (the needle member 242) of the valve element 24 moves apart from the valve seat 231, so as to open the hollow portion 232.

Figure 5A:
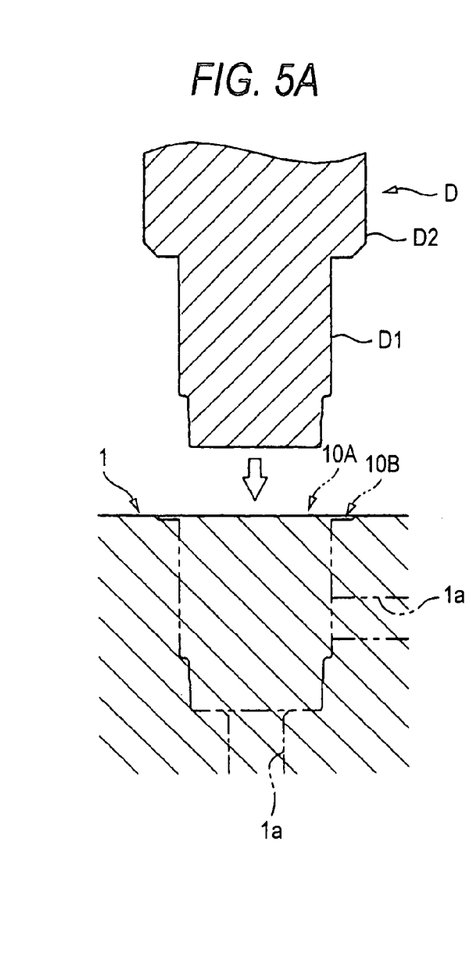
FIGS. 5A to 5C are sectional views which explain a drilling step of a method for producing the vehicle brake hydraulic pressure control unit according to the first embodiment of the invention.
Figure 5B:
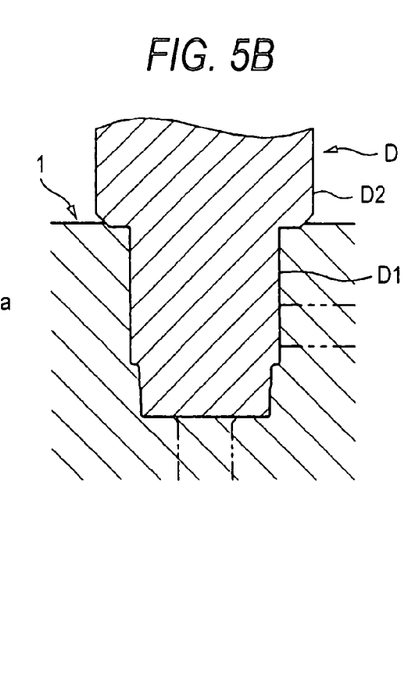
Figure 5C:
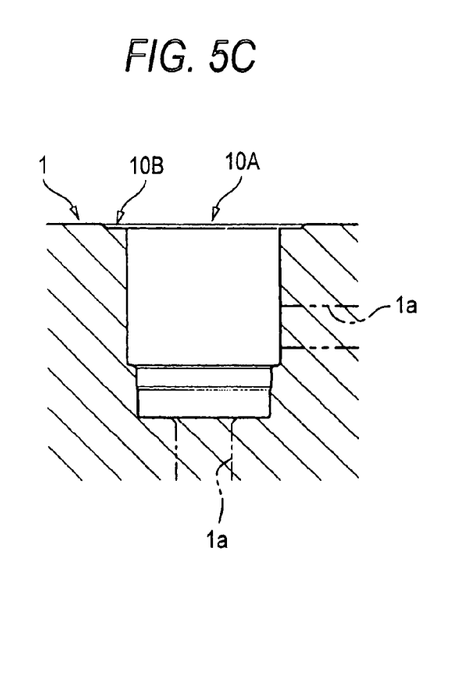
Figure 6A:
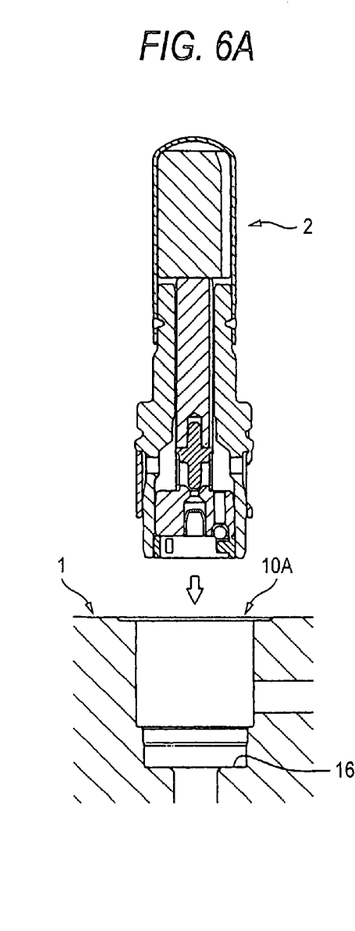
FIGS. 6A to 6C are sectional views which explain an inserting step and a fixing step of the method for producing the vehicle brake hydraulic pressure control unit according to the first embodiment of the invention.
Figure 6B:
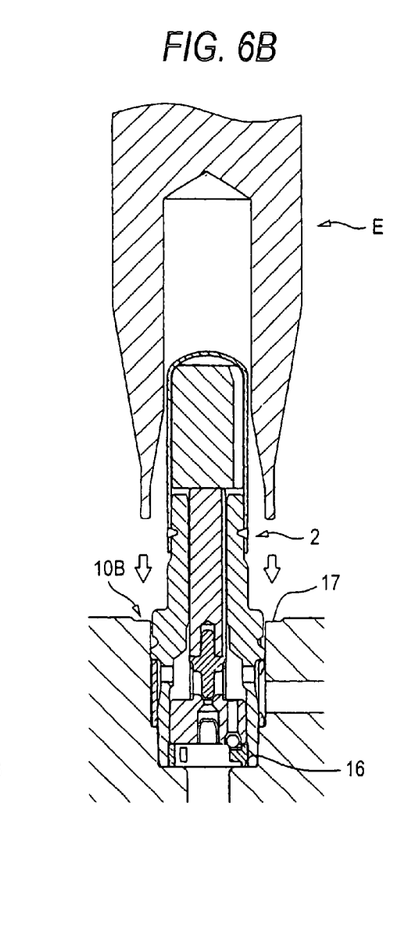
Figure 6C:
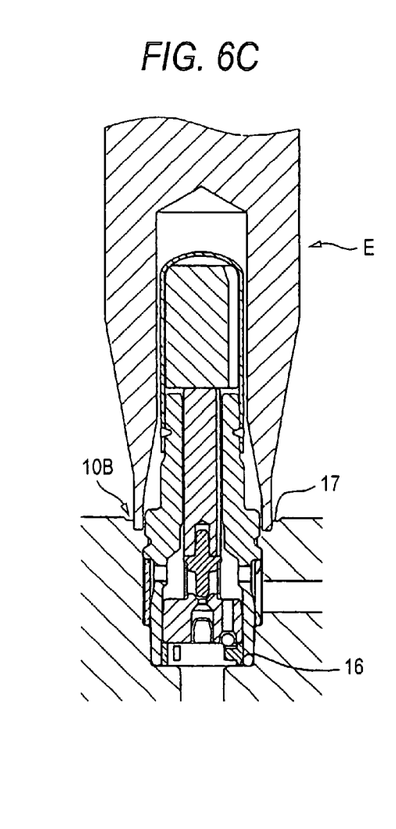
Figure 7A:
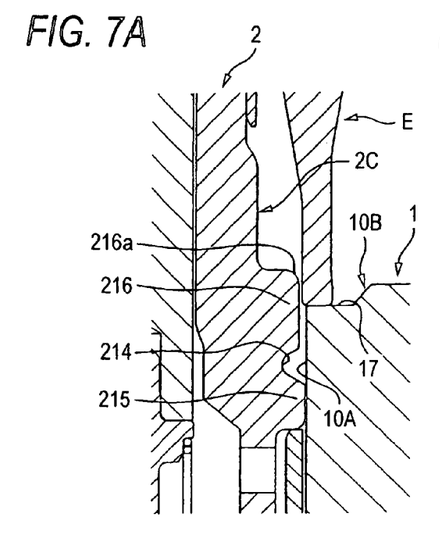
FIGS. 7A to 7D are sectional views which explain in detail the fixing step.
Figure 7B:
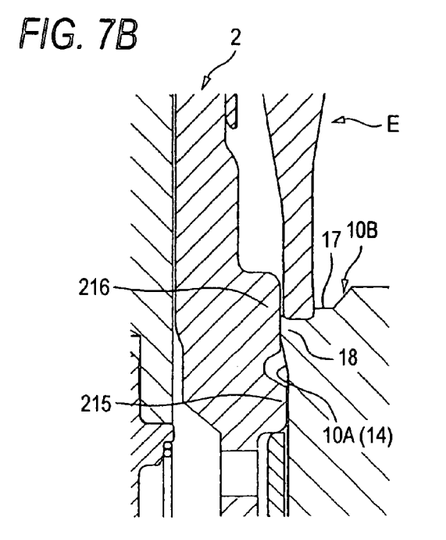
Figures 7C, 7D:
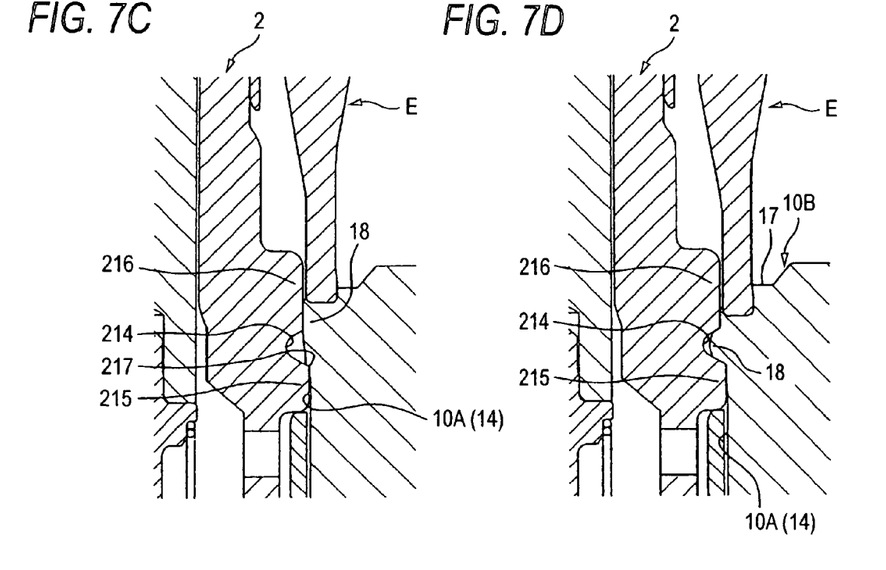

Referring to FIGS. 5 to 7, a method for producing the vehicle brake hydraulic pressure control unit U will be described.

Firstly, as shown in FIG. 5A, a mounting hole portion 10A and a recessed portion 10B are formed in a base body 1 which is formed into a predetermined shape (a drilling step). The mounting hole portion 10A and the recessed portion 10B are formed integrally through a single step by employing a stepped drilling tool D. The drilling tool D includes a lower stepped portion D1 having a cutting blade for forming the mounting hole portion 10A and an upper stepped portion D2 having a cutting blade for forming the recessed portion 10B. Then, as shown in FIGS. 5B and 5C, when the drilling tool D is pressed against a surface of the base body 1 while rotating the drilling tool D, the mounting hole portion 10A is formed by the lower stepped portion D1. Following this, the recessed portion 10B is formed by the upper stepped portion D2.

In addition, although the illustration of forming them is omitted here, before and after the operations described above, holes (bores) for mounting the normally closed electromagnetic valve 3, the reservoir 4, the pump 5 (refer to FIG. 1) and the like are formed in appropriate locations in the base body 1, and brake fluid flow paths 1a and the like are formed in an interior of the base body 1 by cutting surfaces of the base body 1.

Next, as shown in FIGS. 6A and 6B, the normally open electromagnetic valve 2 is inserted into the mounting hole portion 10A, and the lower end surface thereof is brought into abutment with the bottom surface 16 of the mounting hole portion 10A (an inserting step). Namely, as shown in FIG. 4, the press-fit portion 211 of the electromagnetic valve 2 is press fitted in the abutment portion 11 of the mounting hole portion 10A, and the full circumference of the lower end surface of the small diameter portion 212 is brought into abutment with the bottom surface 16 of the mounting hole portion 10A while joining the outer circumferential surface of the press-fit portion 211 to the inner circumferential surface of the abutment portion 11. In this embodiment, since the tapered portion 13 formed between the abutment portion 11 and the introducing portion 12 of the mounting hole portion 10A and the small diameter portion 211 formed at the lower end portion of the electromagnetic valve 2 both function as a "guide" for the electromagnetic valve 2, the press-fit portion 211 of the electromagnetic valve 2 can be press fitted in the abutment portion 11 of the mounting hole portion 10A in a simple and ensured fashion.

According to this embodiment, the accommodation space K is defined by the outer circumferential surface of the small diameter portion 212 and the inner circumferential surface of the abutment portion 11 of the mounting hole portion 10A when the press-fit portion 211 of the electromagnetic valve 2 is press fitted in the abutment portion 11 of the mounting hole portion 10A and the lower end surface of the small diameter portion 212 is brought into abutment with the bottom surface 16 of the mounting hole portion 10A. Therefore, chippings or the like which are produced in association with the press fitting of the electromagnetic valve are accommodated within the accommodation space K so defined. Furthermore, the inserting position of the electromagnetic valve 2 comes to be restricted vertically (in a depth direction) as well as radially.

Following this, the hole wall of the mounting hole portion 10A is clamped based on the inserting position of the electromagnetic valve 2, so as to fix the electromagnetic valve 2 in place (a fixing step). Namely, as shown in FIG. 6C, a clamping jig E which exhibits a bottomed cylindrical shape is pressed against the bottom surface 17 of the recessed portion 10B while maintaining the state in which the lower end surface is in abutment with the bottom surface 16 of the mounting hole portion 10A, so that the hole wall of the mounting hole portion 10A is pressed downwards (towards the bottom surface 16) by the clamping jig E so as to form a plastically deformed portion 18 (refer to FIG. 4). The plastically deformed portion 18 so formed is then made to be locked in the locking groove 214 (refer to FIG. 4) formed on the outer circumferential surface of the electromagnetic valve 2, whereby the electromagnetic valve 2 is clamped and fixed in place in the mounting hole portion 10A. By pressing the bottom surface 17 of the recessed portion 10B towards the bottom surface 16 of the mounting hole portion 10A after the electromagnetic valve 2 has been inserted into the mounting hole portion 10A so as to form the plastically deformed portion 18, the electromagnetic valve 2 is held in the mounting hole portion 10A in such a manner as not to be dislocated therefrom, and also is sealed fluid tightly by virtue of a residual radial stress in the plastically deformed portion 18. In addition, in this embodiment, the inserting position of the electromagnetic valve is restricted by joining the outer circumferential surface of the lower end portion of the electromagnetic valve 2 to the inner circumferential surface of the abutment portion 11 of the mounting hole portion 10A and bringing the whole circumference of the lower end surface of the electromagnetic valve 2 into abutment with the bottom surface 16 of the mounting hole portion 10A and the hole wall of the holding portion 14 of the mounting hole portion 10A which does not contribute to the positioning of the electromagnetic valve 2 is clamped while the inserting position is maintained. Accordingly, the electromagnetic valve 2 is made difficult to be inclined when the electromagnetic valve 2 is fixed.

Referring to FIGS. 7A to 7D, the fixing step will be described in greater detail. Firstly, as shown in FIG. 7A, a full circumference of a lower end surface of the clamping jig E is brought into abutment with an inner circumferential edge of the bottom surface 17 of the recessed portion 10B. Note that while an inside diameter of the clamping jig E is substantially the same as an outside diameter of the upper lid 216 of the electromagnetic valve 2, since the upper circumferential edge portion 216a of the upper lid 216 of the electromagnetic valve 2 is chamfered, the clamping jig E can be positioned in a smooth fashion. Namely, when the clamping jig E is placed over the electromagnetic valve 2, since the lower end portion of the clamping jig E is guided by the circumferential edge portion 216a, the full circumference of the lower end surface of the clamping jig E can be brought into abutment with the bottom surface 17 of the recessed portion 10B in an ensured fashion.

Figure 8:
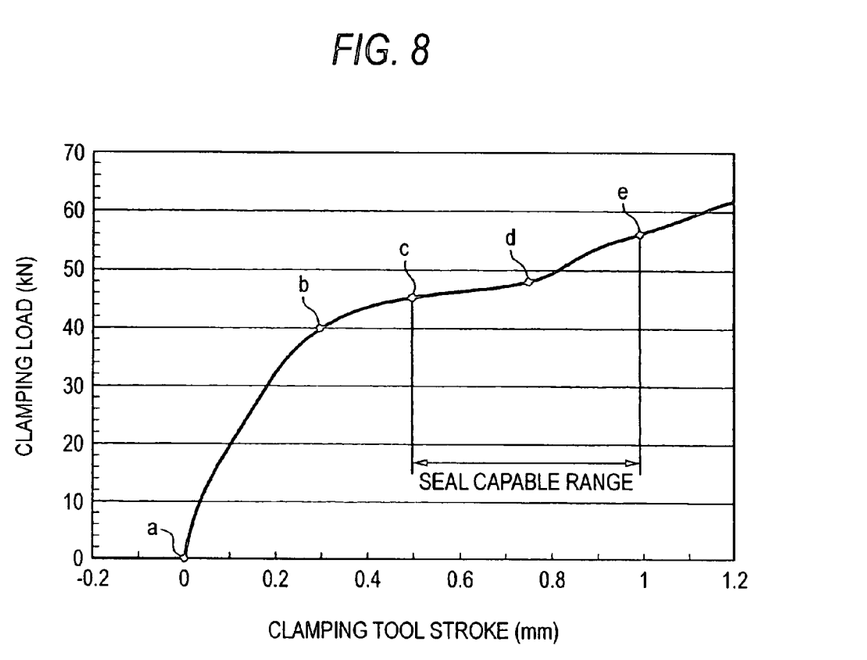
FIG. 8 is a graph showing a transition of clamping load.

Next, a downward clamping load is applied to the clamping jig E ("a"→"b" in a graph shown in FIG. 8), and the lower end portion of the clamping jig E is, as shown in FIG. 7B, caused to sink into the bottom surface 17 of the recessed portion 10B. Note that since the gap is defined between the inner circumferential surface of the holding portion 14 of the mounting hole portion 10A and the outer circumferential surface of the upper lid 216 of the electromagnetic valve 2 (refer to FIG. 7A), when the lower end portion of the clamping jig E is caused to sink into the bottom surface 17 of the recessed portion 10B, the hole wall of the mounting hole portion 10A at the holding portion 14 is plastically deformed (plastically flows) towards the upper lid 216 of the electromagnetic valve 2, whereby the full circumference of the inner circumferential surface of the holding portion 14 (refer to FIG. 3) of the mounting hole portion 10A comes to be joined to the outer circumferential surface of the upper lid 216 of the electromagnetic valve 2. Incidentally, since the gap is defined between the inner circumferential surface of the holding portion 14 of the mounting hole portion 10A and the outer circumferential surface of the upper lid 216 of the electromagnetic valve 2, the hole wall of the mounting hole portion 10A can be plastically deformed with a small clamping load.

When the clamping load is increased ("b"→"c" in the graph shown in FIG. 8), the lower end portion of the clamping jig E is made to sink deeper as shown in FIG. 7C. In association with this, the hole wall of the mounting hole portion 10A is pushed out over an upper side of the lower lid 215 of the electromagnetic valve 2 so as to press hold a boundary portion 217 between the lower lid 215 and the locking groove 214 along the full circumference thereof. In addition, at this point in time, the electromagnetic valve 2 is locked by the plastically deformed portion 18 in such a manner as not to be dislocated from the mounting hole portion 10A and a seal is established between the holding portion 14 of the mounting hole portion 10A and the lower lid 215 of the electromagnetic valve 2 by virtue of the residual radial stress in the plastically deformed portion 18.

When the clamping force is increased further ("c"→"d" in the graph shown in FIG. 8), the plastic deformation (plastic flowing) is developed further by the hole wall of the mounting hole portion 10A, as shown in FIG. 7D, the plastically deformed portion 18 formed on the hole wall of the mounting hole portion 10A comes to enter the locking groove 214 on the electromagnetic valve 2.

In addition, when the clamping load is increased far more ("d"→"e" in the graph shown in FIG. 8), although an illustration thereof is omitted, the whole of the locking groove 214 of the electromagnetic valve 2 is filled with the plastically deformed portion 18 of the mounting hole portion 10A. Thus, in the vehicle brake hydraulic pressure control unit U, the stroke and clamping load of the clamping jig E are controlled so that they fall within ranges defined from "c" to "e" shown in FIG. 8, the aforesaid location can be sealed.

Before or after the normally open electromagnetic valve 2 is assembled, when the normally closed electromagnetic valve 3, the reservoir 4, the pump 5, the pressure sensor 6, the motor 7 and the like are, as shown in FIG. 1, assembled on to the base body 1 and the housing 9 is assembled further to cover the electromagnetic valves 2, 3, the vehicle brake hydraulic pressure control unit U is then completed.

According to the vehicle brake hydraulic pressure control unit U that has been described heretofore, even in the event that chippings are produced when press fitting the electromagnetic valve 2 in the mounting hole portion 10A in the base body 1, since the chippings so produced are accommodated in the accommodation space K, the mixing of the chippings into the brake fluid can be prevented. Namely, an increase in sliding resistance at the sliding portion of the vehicle brake hydraulic pressure control unit U can be suppressed, and furthermore, the wear of the seal portion can be prevented.

Furthermore, in the vehicle brake hydraulic pressure control unit U, the recessed portion 10B is formed along the periphery of the mounting hole portion 10A, the bottom surface 17 of the recessed portion 10B is formed so that the bottom surface 16 of the mounting hole portion 10A is as a standard, and the lower end surface of the electromagnetic valve 2 is brought into abutment with the bottom surface 16 of the mounting hole portion 10A. Accordingly, deviation in magnitude of the clamping load is made difficult to occur when the electromagnetic valve 2 is fixed in place in the mounting hole portion 10A. Namely, although the stroke of the clamping jig E is dependent on the distance from the surface of the base body 1 (in this embodiment, the bottom surface 17 of the recessed portion 10B) to the locking groove 214 of the electromagnetic valve 2, in this vehicle brake hydraulic pressure control unit U, deviation in depth of the mounting hole portion 10A (namely, a distance from the bottom surface 16 of the mounting hole portion 10A to the bottom surface 17 of the recessed portion 10B) is made difficult to occur due to the bottom surface 17 of the recessed portion 10B being formed based on the bottom surface 16 of the mounting hole portion 10A. Furthermore, deviation in amount in which the electromagnetic valve 2 is inserted is made difficult to occur due to the lower end surface of the electromagnetic valve 2 being brought into abutment with the bottom surface 16 of the mounting hole portion 10A. Consequently, deviation in distance from the bottom surface 17 of the recessed portion 10B to the locking groove 214 of the electromagnetic valve 2 is also made difficult to occur. As a result of this, deviation in amount in which the plastically deformed portion 18 is filled in the locking portion 214 is made difficult to occur.

In particular, in this embodiment, since the mounting hole portion 10A and the recessed portion 10B are formed integrally by the same drilling tool D, deviation in depth of the mounting hole portion 10A is decreased to an extremely low level, and deviation in distance from the bottom surface 17 of the recessed portion 10B to the locking groove 214 of the electromagnetic valve becomes dependent only on the production accuracy of the electromagnetic valve 2. Namely, according to the vehicle brake hydraulic pressure control unit U, the deviation in distance from the bottom surface 17 of the recessed portion 10B to the locking groove 214 of the electromagnetic valve 2 becomes extremely small, and consequently, deviation in stroke of the clamping jig E also becomes extremely small.

Figure 9A:
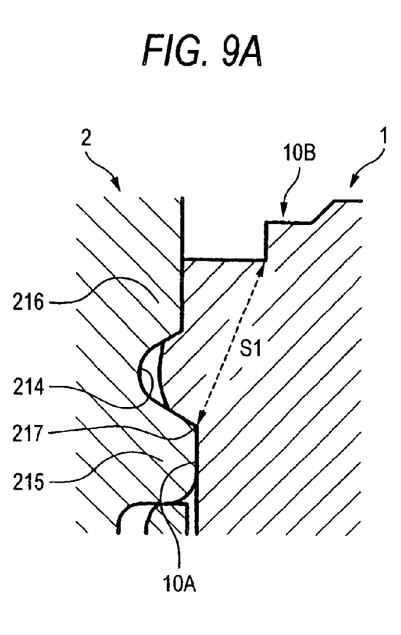
FIG. 9A is a sectional view which explains the function of the vehicle brake hydraulic pressure control unit according to the first embodiment of the invention.
Figure 9B:
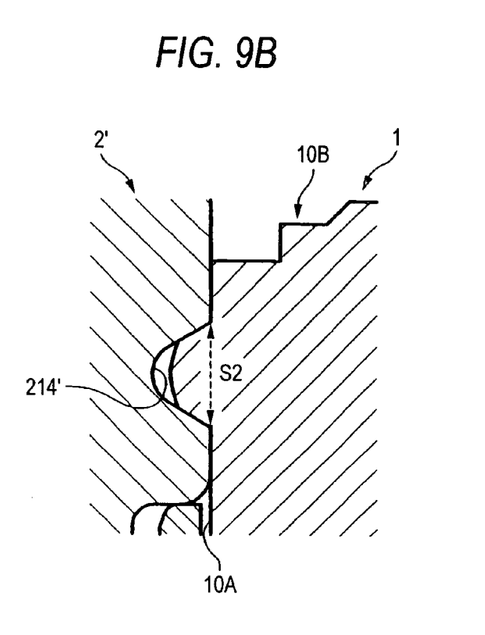
FIG. 9B is a sectional view which shows a vehicle brake hydraulic pressure control unit according to a comparison example.

In addition, in the vehicle brake hydraulic pressure control unit U, the outside diameter of the electromagnetic valve 2 at the upper side of the locking groove 214 is made smaller than the outside diameter of the electromagnetic valve 2 at the lower side of the locking groove 214. Therefore, the hole diameter of the mounting hole portion 10A after plastic deformation (clamping) becomes smaller at the upper side than at the lower side of the locking groove 214. Consequently, when force is applied to the electromagnetic valve 2 in a direction in which the electromagnetic valve 2 is pushed out from the mounting hole portion 10A, a shear fracture plane is, as shown in FIG. 9A, formed in such a manner as to rise obliquely upwards from the lower outer circumferential edge of the locking groove 214 (the boundary portion 217 between the lower lid 215 and the locking groove 214). In the event that the outside diameter of the electromagnetic valve 2 becomes the same at an upper side as at a lower side of a locking groove 214' as shown in FIG. 9B, a shear fracture distance S2 becomes equal to the groove width of the locking groove 214'. However, as shown in FIG. 9A, in the event that the hole diameter at the upper side of the locking groove 214 is made smaller than the hole diameter at the lower side thereof, a shear fracture distance S1 becomes equal to or larger than the groove width of the locking groove 214. Therefore, even in the event that the groove width of the locking groove 214 is made smaller than the groove width of the locking groove 214', an assembling strength (a resisting force against the push-out force by the brake hydraulic pressure) which is equal to that produced in the case shown in FIG. 9B can be secured.

In addition, in the vehicle brake hydraulic pressure control unit U, since the gap is defined at the upper side of the locking groove 214, the plastically deformed portion 18 can be formed with a small clamping load. Hence, a reduction in size of the production equipment can be attained.

Figure 10A:
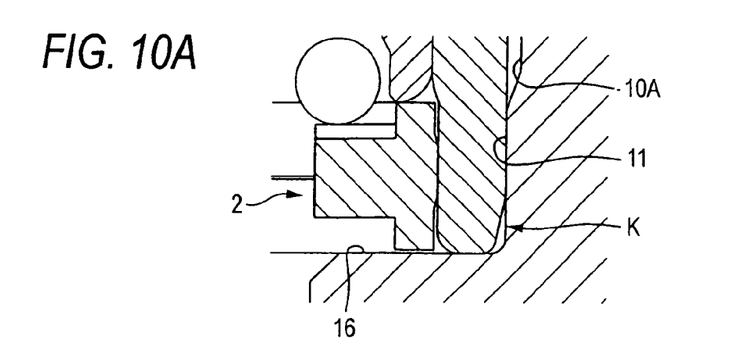
FIG. 10A is an enlarged sectional view of FIG. 4.
Figure 10B:
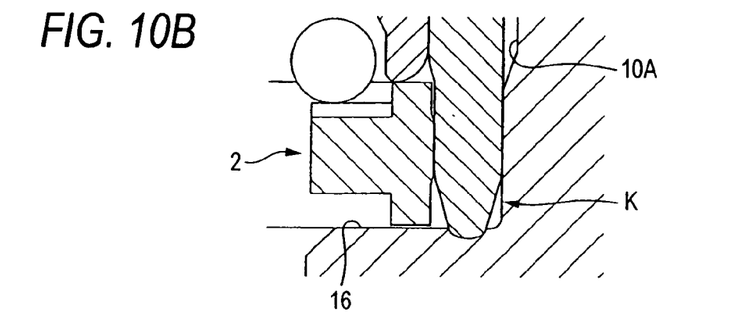
FIGS. 10B to 10D are enlarged sectional views showing modified examples of the vehicle brake hydraulic pressure control unit according to the first embodiment of the invention.

Note that there will be no problem even in the event that the configuration of the vehicle brake hydraulic pressure control unit is modified as required. For example, while in the embodiment, the lower end surface of the electromagnetic valve 2 is formed into the flat shape so as to be brought into abutment with the bottom surface 16 of the mounting hole portion 10A, a lower end surface of an electromagnetic valve 2 may be formed into a shape which is convex relative to a bottom surface 16 of a mounting hole portion 10A as shown in FIG. 10B, so as to be made to sink into the bottom surface 16 of the mounting hole portion 10A. By adopting this configuration, since the contact surface pressure between the lower end surface of the electromagnetic valve 2 and the bottom surface 16 of the mounting hole portion 10A is increased, the closeness of the accommodation space K is increased further.

Figure 10C:
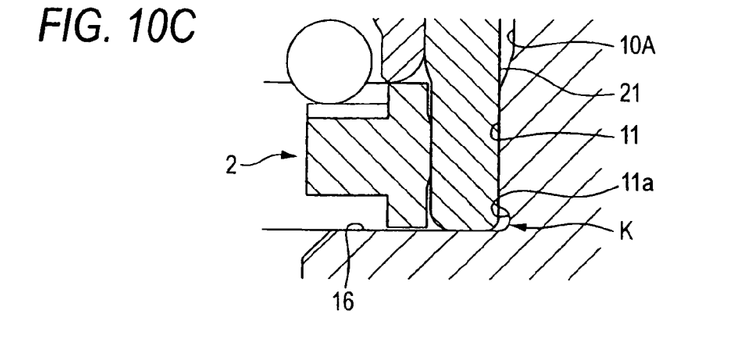

In addition, as shown in FIG. 10C, a circumferential surface groove 11a may be provided on an inner circumferential surface of an abutment portion 11 of a mounting hole portion 10A by setting back a relevant location into the inner circumferential surface along the circumferential direction, so as to form an accommodation space K by making use of the circumferential surface groove 11a. Namely, part of the abutment portion 11 of the mounting hole portion 10A may be expanded diametrically so as to form the accommodation space K. In addition, while in an electromagnetic valve 2 in FIG. 10C, a small diameter portion 212 (refer to FIG. 4) is omitted, the accommodation space K is secured by providing the circumferential surface groove 11a. Since working on an electromagnetic valve 2 can be omitted or simplified in the event that an accommodation space K is formed by working on a mounting hole portion 10A, a conventional electromagnetic valve can be carried over for assembly into the mounting hole portion 10A so worked. In addition, in the event that working on an electromagnetic valve 2 is simplified, an accommodation space K can be secured without reducing the strength of a valve housing 21 or the like of the electromagnetic valve 2.

Figure 10D:
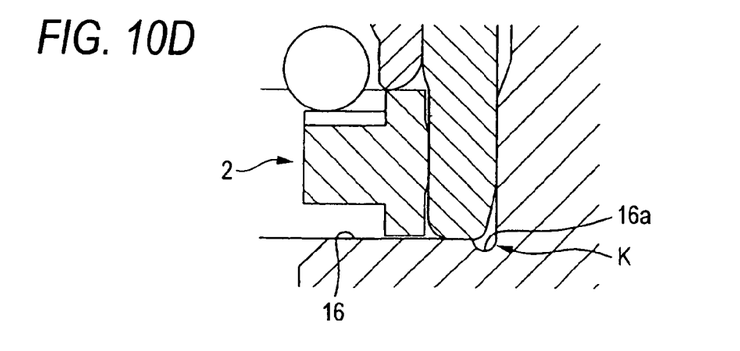

Furthermore, as shown in FIG. 10D, a bottom surface groove 16a may be provided on a bottom surface 16 of a mounting hole portion 10A by setting back a relevant location into the bottom surface 16 along an outer circumference thereof, so as to form an accommodation space K by making use of the bottom surface groove 16a so provided. In addition, the bottom surface groove 16a can be formed by a candle type drill, the bottom surface groove 16a can be formed more simply and inexpensively than the circumferential surface groove 11a shown in FIG. 10C.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A vehicle brake hydraulic pressure control unit comprising:
   a base body comprising:
      a brake fluid flow path; and
      a mounting hole portion comprising:
         a bottom sealing surface formed on a bottom surface thereof; and
         an inner circumferential sealing surface formed on an inner circumferential surface thereof; and
   an assembled part which is assembled into the mounting hole portion so as to communicate with the flow path, the assembled part comprising:
   a locking groove formed on an outer circumferential surface of a lid portion by setting back a relevant location into the outer circumferential surface along a circumferential direction, the lid portion above the locking groove having a diameter smaller than the lid portion below the locking groove;
   a lower end sealing portion formed on a lower end surface thereof and hermetically contacting with the bottom sealing surface of the mounting hole portion to form a lower side sealing portion; and
   an outer circumferential sealing portion formed on an outer circumferential surface thereof and hermetically contacting with the inner circumferential sealing surface of the mounting hole portion to form a circumferential sealing portion, wherein
   a hermetic accommodation space is defined by the lower side sealing portion and the circumferential sealing portion, wherein:
   a lower end portion of the assembled part comprises:
      a press-fit portion which is press fitted in the inner circumferential sealing surface of the mounting hole portion; and
      a small diameter portion whose diameter is smaller than a diameter of the press-fit portion,
   the accommodation space is further defined by an outer circumferential surface of the small diameter portion and an inner circumferential surface of the mounting hole portion,
   the small diameter portion is formed on a lower side of the press-fit portion,
   a lower end surface of the small diameter portion is brought into abutment with the bottom sealing surface of the mounting hole portion,
   the press fit portion comprises the lower end sealing portion, and an outer diameter of the press-fit portion is made equal to or slightly larger than a diameter of the mounting hole portion at a cylindrical abutment portion or a hole diameter of the cylindrical abutment portion,
   the lower end sealing portion is the small diameter portion formed on a lower side of the press-fit portion; and
   a lower end surface of the small diameter portion, which comprises the lower end sealing portion, is brought into abutment with a bottom surface of the mounting hole portion over its entirety along a full circumference thereof.

2. The vehicle brake hydraulic pressure control unit as set forth in claim 1, wherein
a circumferential groove is provided on the inner circumferential surface of the mounting hole portion along a circumferential direction, and
the accommodation space is further defined by the circumferential groove.

3. The vehicle brake hydraulic pressure control unit as set forth in claim 1, wherein
a bottom groove is provided on the bottom surface of the mounting hole portion along an outer circumference of the bottom surface, and wherein
the accommodation space is further defined by the bottom groove.

4. The vehicle brake hydraulic pressure control unit as set forth in claims 1, wherein
the lower end surface of the assembled part is formed into a shape which protrudes towards the bottom surface of the mounting hole portion.

5. The vehicle brake hydraulic pressure control unit as set forth in claim 1, wherein:
the mounting hole portion comprises:
an introducing portion which is formed at an upper side of the inner circumferential sealing surface; and
a tapered portion which connects the inner circumferential sealing surface with the introducing portion, and
a diameter of the introducing portion is made larger than a diameter of the inner circumferential sealing surface.

6. The vehicle brake hydraulic pressure control unit as set forth in claim 1, wherein:
the locking groove accommodates a plastically deformed portion formed when a hole wall of the mounting hole portion is clamped to enter is formed on the outer circumferential surface of the assembled part, and
an outside diameter of the assembled part at an upper side of the locking groove is made smaller than an outside diameter of the assembled part at a lower side of the locking groove.

7. The vehicle brake hydraulic pressure control unit as set forth in claim 6, wherein a diameter of the mounting hole portion after plastic deformation is smaller at the upper side than at the lower side of the locking groove.

8. The vehicle brake hydraulic pressure control unit as set forth in claim 1, wherein the mounting hole portion comprises:
a recessed portion which surrounds the mounting hole portion;
the cylindrical abutment portion which comprises the inner circumferential sealing surface formed in a deepest portion;
a cylindrical introducing portion which is formed in a location which lies shallower than the cylindrical abutment portion;
a truncated cone-shaped tapered portion which connects the cylindrical abutment portion with the cylindrical introducing portion;
a cylindrical holding portion which is formed in a location which lies shallower than the cylindrical introducing portion; and
a truncated cone-shaped connecting portion which connects the cylindrical introducing portion with the cylindrical holding portion.

9. The vehicle brake hydraulic pressure control unit as set forth in claim 8, wherein a diameter of the mounting hole portion at the cylindrical introducing portion is larger than a diameter at the cylindrical abutment portion, and a diameter of the mounting hole portion at the cylindrical holding portion is larger than the diameter at the cylindrical introducing portion.

10. The vehicle brake hydraulic pressure control unit as set forth in claim 1, wherein when the press-fit portion is press fitted in the cylindrical abutment portion of the mounting hole portion, and an outer circumferential surface of the press-fit portion is joined to the inner circumferential sealing surface of the cylindrical abutment portion, whereby leakage of brake fluid by way of the inner circumferential surface of the cylindrical abutment portion is prevented.

11. The vehicle brake hydraulic pressure control unit as set forth in claim 1, wherein the assembled part comprises a valve compartment portion having a wall integral with a cylindrical valve housing, which forms the lower end sealing portion, the valve compartment portion faces inner circumferential surfaces of an introducing portion and cylindrical holding portion of the mounting hole portion with a gap defined therebetween.

12. The vehicle brake hydraulic pressure control unit as set forth in claim 1, wherein the lid portion includes an outside diameter at an upper side of the locking groove smaller than an outside diameter at a lower side thereof.

13. The vehicle brake hydraulic pressure control unit as set forth in claim 12, wherein:
the lid portion includes a lower lid and an upper lid, the lower lid lies further upwards than the flow path which is made to open to a holding portion when the assembled part is in place in the mounting hole portion;
an outside diameter of the lower lid is made larger than outside diameters of an insertion portion of the assembled part, and a protruding portion of the assembled part is slightly smaller than the diameter of the mounting hole portion at a holding portion or hole diameter of the holding portion;
an outer circumferential surface of the lower lid faces an inner circumferential surface of the holding portion of the mounting hole portion with a slight gap defined therebetween;
the upper lid protrudes from a bottom surface of a recessed portion of the mounting hole portion, and an upper circumferential edge portion of the upper lid is chamfered; and
the outside diameter of the upper lid is made smaller than a hole diameter of the holding portion of the mounting hole portion.

14. The vehicle brake hydraulic pressure control unit as set forth in claim 1, wherein the assembled part comprises a valve housing, wherein an inner space of the valve housing is formed into a stepped cylindrical shape which sequentially increases its diameter as it extends from a top surface to a bottom surface.

* * * * *